United States Patent
Li et al.

(10) Patent No.: US 10,049,279 B2
(45) Date of Patent: Aug. 14, 2018

(54) RECURRENT NETWORKS WITH MOTION-BASED ATTENTION FOR VIDEO UNDERSTANDING

(71) Applicant: QUALCOMM Incorporated, San Diego, CA (US)

(72) Inventors: Zhenyang Li, Amsterdam (NL); Efstratios Gavves, Amsterdam (NL); Mihir Jain, Amsterdam (NL); Cornelis Gerardus Maria Snoek, Volendam (NL)

(*) Notice: Subject to any disclaimer, the term of this patent is extended or adjusted under 35 U.S.C. 154(b) by 0 days.

(21) Appl. No.: 15/267,621

(22) Filed: Sep. 16, 2016

(65) Prior Publication Data

US 2017/0262705 A1    Sep. 14, 2017

Related U.S. Application Data (60) Provisional application No. 62/306,972, filed on Mar. 11, 2016.

(51) Int. Cl.
  *G06K 9/00* (2006.01)
  *G06K 9/62* (2006.01)
  *G06N 3/04* (2006.01)

(52) U.S. Cl.
  CPC ....... *G06K 9/00718* (2013.01); *G06K 9/6269* (2013.01); *G06N 3/0445* (2013.01); *G06N 3/0454* (2013.01)

(58) Field of Classification Search
  CPC ............ G06K 9/00718; G06K 9/6269; G06N 3/0454; G06N 3/0445
  See application file for complete search history.

(56) References Cited

U.S. PATENT DOCUMENTS

| | | | |
|---|---|---|---|
| 7,982,771 B2 | 7/2011 | Gu et al. | |
| 8,478,111 B2 | 7/2013 | Stankiewicz et al. | |
| 9,269,245 B2 | 2/2016 | Park et al. | |
| 2004/0086046 A1* | 5/2004 | Ma | G06K 9/00711 375/240.16 |
| 2010/0305755 A1* | 12/2010 | Heracles | G06K 9/4671 700/253 |
| 2016/0070962 A1 | 3/2016 | Shetty et al. | |

OTHER PUBLICATIONS

Ni Q., et al., "Video Attention Saliency Mapping using Pulse Coupled Neural Network and Optical Flow," International Joint Conference on Neural Networks (IJCNN), Jul. 6-11, 2014, pp. 340-344.

Aihara K., et al., "Motion Dense Sampling and Component Clustering for Action Recognition," Multimedia Tools and Applications, Jun. 12, 2014 (Jun. 12, 2014), vol. 74(16), pp. 6303-6321, XP055369968, US ISSN: 1380-7501, DOI: 10.1007/s11042-014-2112-1 Section 3.

(Continued)

*Primary Examiner* — John Strege
(74) *Attorney, Agent, or Firm* — Seyfarth Shaw LLP (57) ABSTRACT

A method of predicting action labels for a video stream includes receiving the video stream and calculating an optical flow of consecutive frames of the video stream. An attention map is generated from the current frame of the video stream and the calculated optical flow. An action label is predicted for the current frame based on the optical flow, a previous hidden state and the attention map.

20 Claims, 8 Drawing Sheets

(56) References Cited

OTHER PUBLICATIONS

Donahue J., et al., "Long-term Recurrent Convolutional Networks for Visual Recognition and Description," 2015, pp. 2625-2634.
International Search Report and Written Opinion—PCT/US2017/017192—ISA/EPO—May 19, 2017.
Li Z., et al., "VideoLSTM Convolves, Attends and Flows for Action Recognition," arxiv.org, Cornell University Library, 201 OLIN Library Cornell University Ithaca, NY 14853, Jul. 6, 2016 (Jul. 6, 2016), XP080712545, 17 pages.
Loy C.C., et al., "Salient Motion Detection in Crowded Scenes," Communications Control and Signal Processing (ISCCSP), 2012 5th International Symposium on, IEEE, May 2, 2012 (May 2, 2012), pp. 1-4, XP032188227, DOI: 10.1109/ISCCSP.2012.6217836 ISBN: 978-1-4673-0274-6 Section 2.
Rezazadegan F., et al., "Enhancing Human Action Recognition with Region Proposals," Australasian Conference on Robotics and Automation 2015, Dec. 31, 2015 (Dec. 31, 2015) XP055370131, Sections 1 and 3, 6 pages.
Sharma S., et al., "Action Recognition Using Visual Attention," Feb. 14, 2016 (Feb. 14, 2016), XP055367387, Retrieved from the Internet: URL:https://arxiv.org/pdf/1511.04119.pdf [retrieved on Apr. 25, 2017] Sections 1, 3.1 and 3.2, 11 pages.

\* cited by examiner

RECURRENT NETWORKS WITH MOTION-BASED ATTENTION FOR VIDEO UNDERSTANDING

CROSS-REFERENCE TO RELATED APPLICATION

The present application claims the benefit of U.S. Provisional Patent Application No. 62/306,972, filed on Mar. 11, 2016, and titled "RECURRENT NETWORKS WITH MOTION-BASED ATTENTION FOR VIDEO UNDERSTANDING," the disclosure of which is expressly incorporated by reference herein in its entirety.

BACKGROUND

Field

Certain aspects of the present disclosure generally relate to machine learning and, more particularly, to improving systems and methods of predicting labels for a video stream.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Recurrent neural networks (RNNs) are a class of neural network, which includes a cyclical connection between nodes or units of the network. The cyclical connection creates an internal state that may serve as a memory that enables RNNs to model dynamical systems. That is, these cyclical connections offer RNNs the ability to encode memory and as such, these networks, if successfully trained, are suitable for sequence learning applications.

Long short-term memory (LSTM) is a type of RNN in a microcircuit composed of multiple units to store values in memory using gating functions and multipliers. LSTMs are able to hold a value in memory for an arbitrary length of time. As such, LSTMs may be useful in learning, classification systems (e.g., handwriting and speech recognition systems), and other applications.

SUMMARY

In an aspect of the present disclosure, a method of predicting action labels for a video stream is presented. The method includes receiving the video stream. The method also includes calculating an optical flow of a current frame and a next frame of the video stream. The method additionally includes generating an attention map from the current frame of the video stream and the calculated optical flow. The method further includes predicting an action label for the current frame based on the optical flow, a previous hidden state and the attention map.

In another aspect of the present disclosure, an apparatus for predicting action labels for a video stream is presented. The apparatus includes a memory and at least one processor coupled to the memory. The one or more processors are configured to receive the video stream. The processor(s) is(are) also configured to calculate an optical flow of a current frame and a next frame of the video stream. The processor(s) is(are) additionally configured to generate an attention map from the current frame of the video stream and the calculated optical flow. The processor(s) is(are) further configured to predict an action label for the current frame based on the optical flow, a previous hidden state and the attention map.

In yet another aspect of the present disclosure, an apparatus for predicting action labels for a video stream is presented. The apparatus includes means for receiving the video stream. The apparatus also includes means for calculating an optical flow of a current frame and a next frame of the video stream. The apparatus additionally includes means for generating an attention map from the current frame of the video stream and the calculated optical flow. The apparatus further includes means for predicting an action label for the current frame based on the optical flow, a previous hidden state and the attention map.

In still another aspect of the present disclosure, a non-transitory computer-readable medium is presented. The non-transitory computer-readable medium has encoded thereon program code for predicting action labels for a video stream. The program code is executed by a processor and includes program code to receive the video stream. The program code also includes program code to calculate an optical flow of a current frame and a next frame of the video stream. The program code additionally includes program code to generate an attention map from the current frame of the video stream and the calculated optical flow. The program code further includes program code to predict an action label for the current frame based on the optical flow, a previous hidden state and the attention map.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Recurrent Networks with Attention and Motion for Video Understanding

Motion information has traditionally been an important ingredient in automated video understanding, both for traditional video encodings using dense trajectories or more recent two-stream deep convolutional neural network architectures. Unlike convolutional neural networks intended for images, recurrent networks were originally proposed to elegantly model sequential data. A popular variant of recurrent networks is the long short-term memory (LSTM) architecture. This model can handle vanishing gradients and is therefore better suited to model longer sequences. Consequently, using LSTMs may be beneficial for modelling the sequential temporal structure of videos and better understanding audiovisual content.

Conventional LSTM architectures do not discriminate between the various spatial locations in a given video frame. Rather, conventional LSTM architectures treat all locations in a video frame equally. However, for understanding video, it is useful to consider that actions are performed by actors, and there are certain regions that are more interesting or pertinent than others. Some conventional approaches have proposed an attention LSTM for action classification, which gives more importance to particular frame locations more relevant to actions of interest. This attention takes the form of a saliency map (e.g., a map of conspicuous regions), which instructs the LSTM network where to focus in a video frame. The conventional attention LSTM uses the LSTM state at frame t to generate the attention for frame t+1, effectively predicting the location of the action in the next frame. However, the conventional attention LSTM models rely on appearance only and ignore valuable motion information.

Accordingly, aspects of the present disclosure are directed to artificial neural networks, such as recurrent neural networks (RNNs), which utilize appearance and motion information to generate attention saliency maps. Furthermore, aspects of the present disclosure are directed to predicting an action label (e.g., a label for an activity of motion by an object of interest) for video frames of a video stream based on the generated attention maps.

Figure 1:
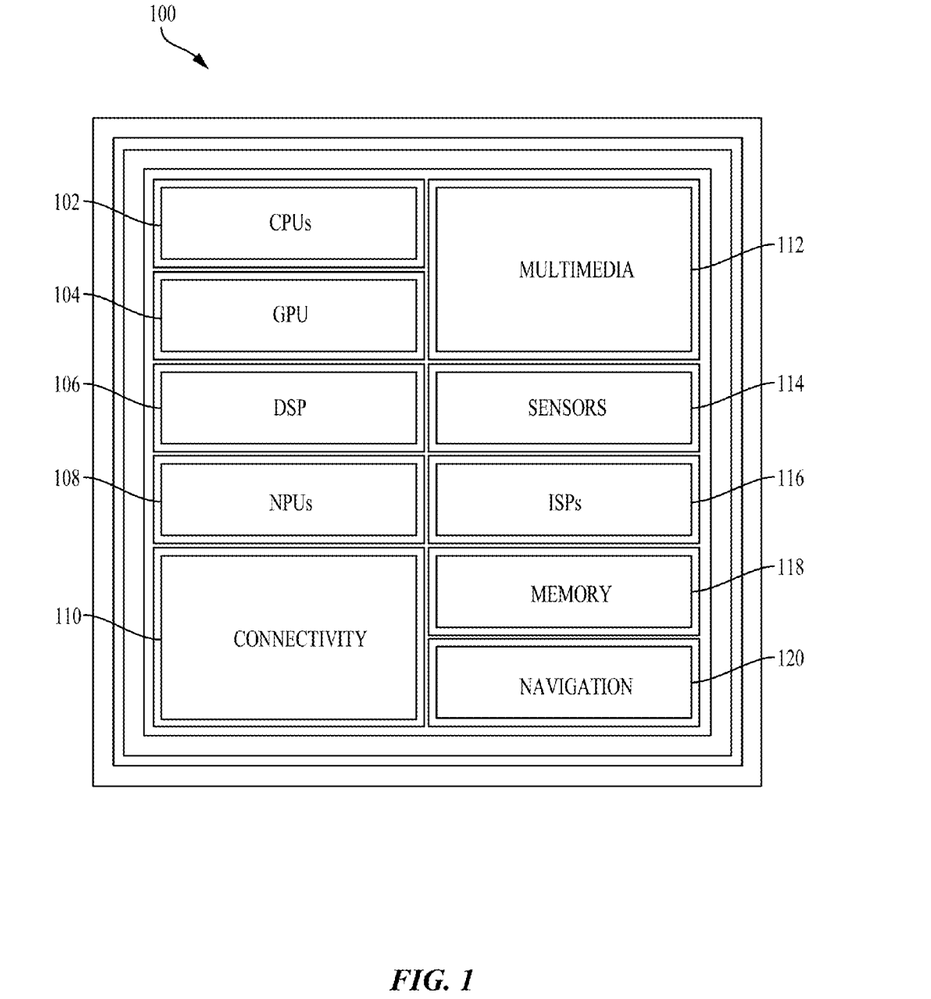
FIG. 1 illustrates an example implementation of designing a neural network using a system-on-a-chip (SOC), including a general-purpose processor in accordance with certain aspects of the present disclosure.

FIG. 1 illustrates an example implementation for predicting action labels for a video stream using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for receiving a video stream. The instructions loaded into the general-purpose processor 102 may also comprise code for calculating an optical flow of either a current frame and a previous frame or the current frame and a next frame of the video stream. Additionally, the instructions loaded into the general-purpose processor 102 may comprise code for generating an attention map from the current frame of the video stream and the calculated optical flow. Furthermore, the instructions loaded into the general-purpose processor 102 may comprise code for predicting an action label for the current frame based on the optical flow, a previous hidden state and the attention map.

Figure 2:
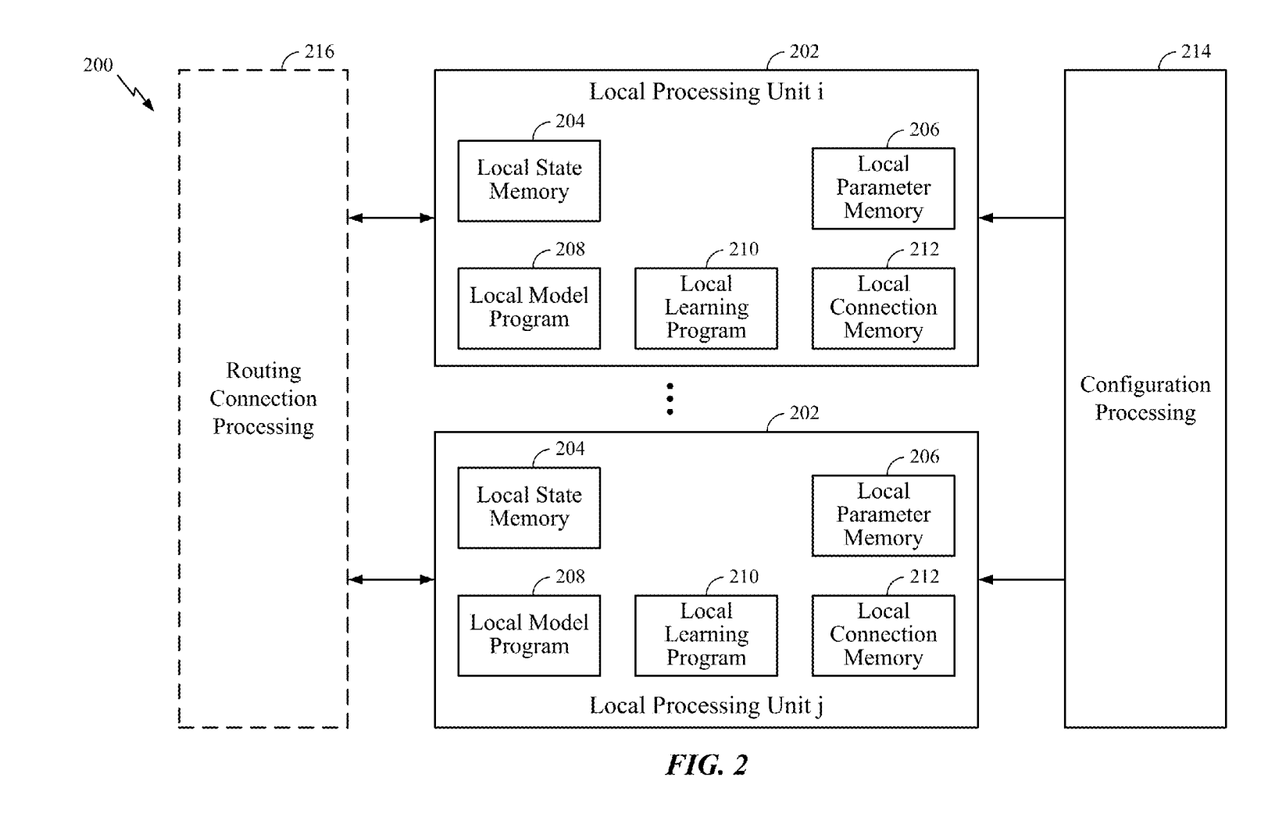
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
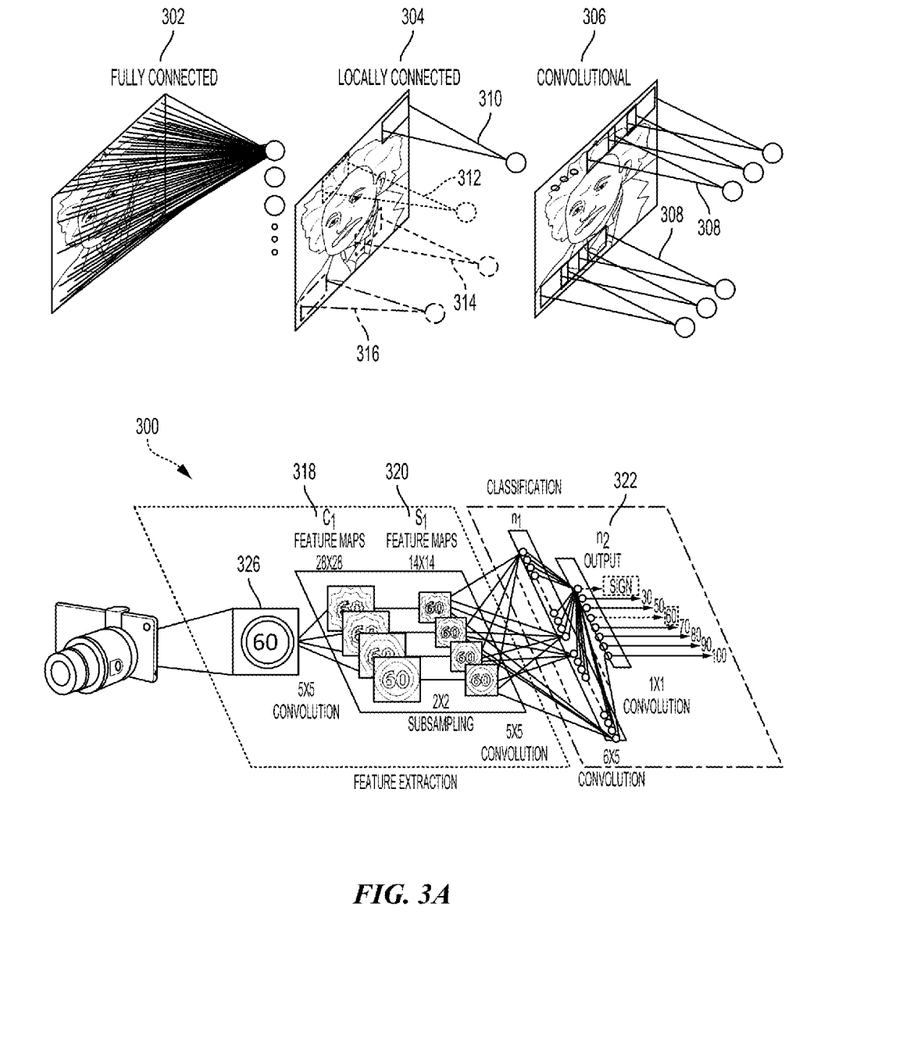
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image 326 of a speed limit sign, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

Figure 3B:
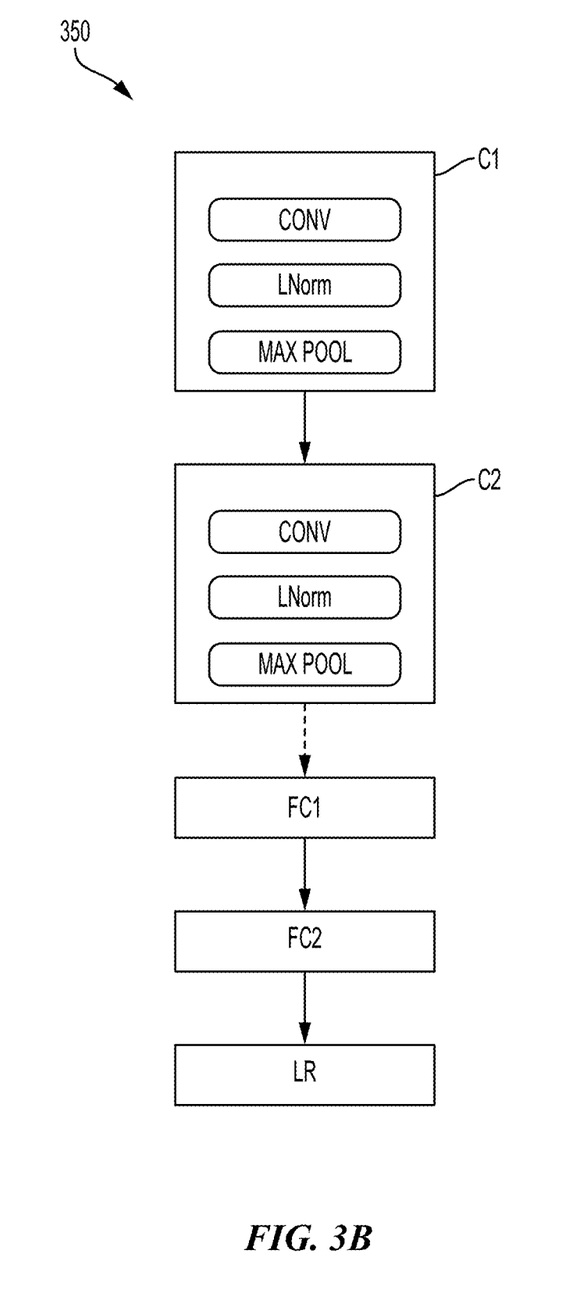
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolution blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
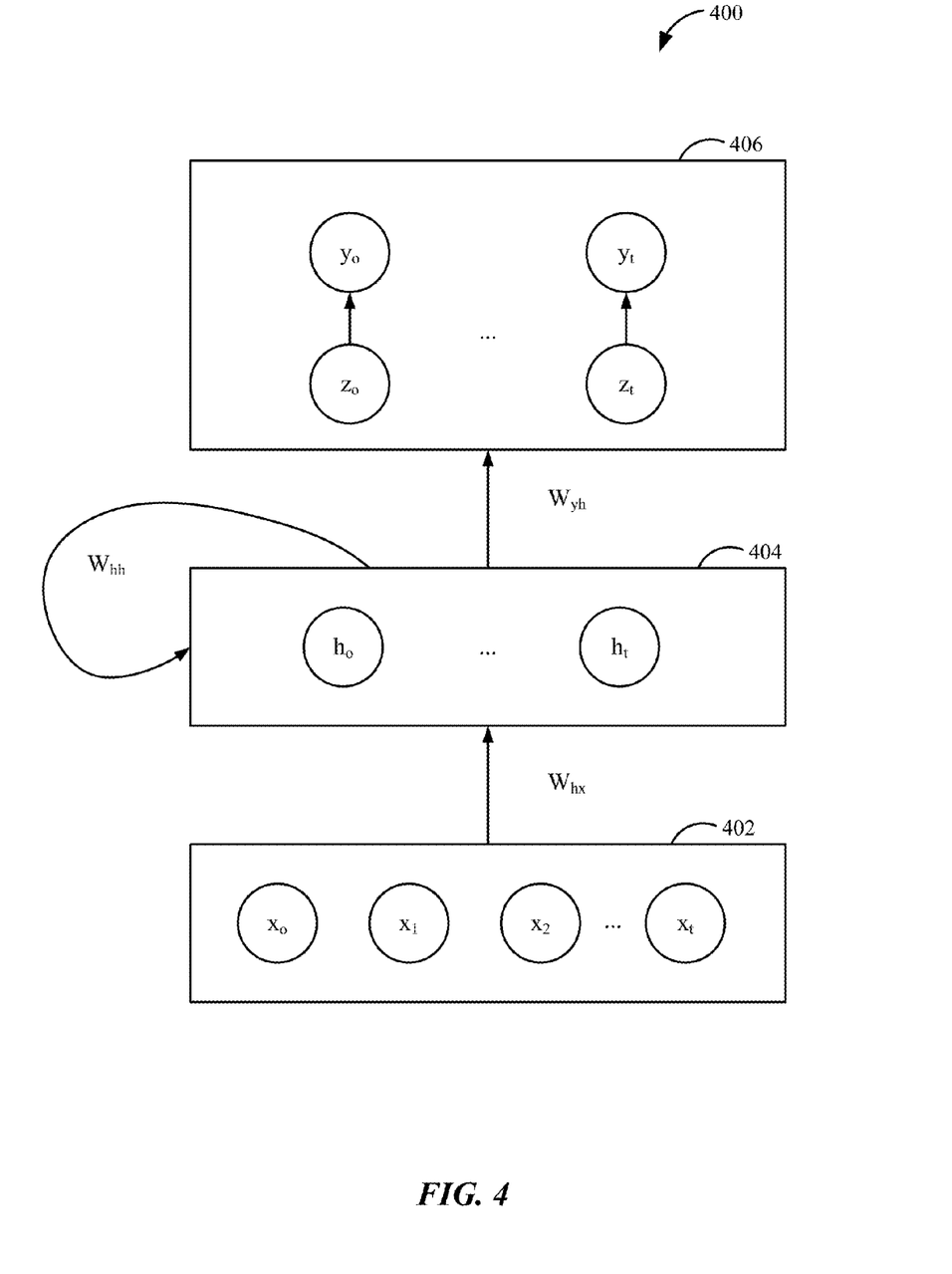
FIG. 4 is a schematic diagram illustrating a recurrent neural network (RNN) according to aspects of the present disclosure.

FIG. 4 is a schematic diagram illustrating a recurrent neural network (RNN) 400. The recurrent neural network 400 includes an input layer 402, a hidden layer 404 with recurrent connections, and an output layer 406. Given an input sequence X with multiple input vectors $x_T$ (e.g., $X=\{x_0, x_1, x_2 \ldots x_T\}$), the recurrent neural network 400 will predict a classification label $y_t$ for each output vector $z_T$ of an output sequence Z (e.g., $Z=\{z_0 \ldots z_T\}$). For FIG. 4, $x_t \in \mathbb{R}^N$, $y_t \in \mathbb{R}^C$, and $z_t \in \mathbb{R}^C$. As shown in FIG. 4, a hidden layer 404 with M units (e.g., $h_o \ldots h_t$) is specified between the input layer 402 and the output layer 406. The M units of the hidden layer 404 store information on the previous values (t<t) of the input sequence X. The M units may be computational nodes (e.g., neurons). In one configuration, the recurrent neural network 400 receives an input $x_T$ and generates a classification label $y_t$ of the output $z_T$ by iterating the equations:

$$s_t = W_{hx}x_t + W_{hh}h_{t-1} + b_h \tag{1}$$

$$h_t = f(s_t) \tag{2}$$

$$o_t = W_{yh}h_t + b_y \tag{3}$$

$$y_t = g(o_t) \tag{4}$$

where $W_{hx}$, $W_{hh}$, and $W_{yh}$ are the weight matrices, $b_h$ and $b_y$ are the biases, $s_t \in \mathbb{R}^M$ and $o_t \in \mathbb{R}^C$ are inputs to the hidden layer 404 and the output layer 406, respectively, and $f$ and $g$ are nonlinear functions. The function $f$ may comprise a rectifier linear unit (RELU) and, in some aspects, the function g may comprise a linear function or a softmax function. In addition, the hidden layer nodes are initialized to a fixed bias bi such that at t=0 $h_o$=bi. In some aspects, bi may be set to zero (e.g., bi=0). The objective function, $C(\theta)$, for a recurrent neural network with a single training pair (x,y) is defined as $C(\theta) = \Sigma_t L_t(z, y(\theta))$, where $\theta$ represents the set of parameters (weights and biases) in the recurrent neural network. For regression problems, $L_t = \|(z_t - y_t)^2\|$ and for multi-class classification problems, $L_t = -\Sigma_j z_{tj} \log(y_{tj})$.

Figure 5A:
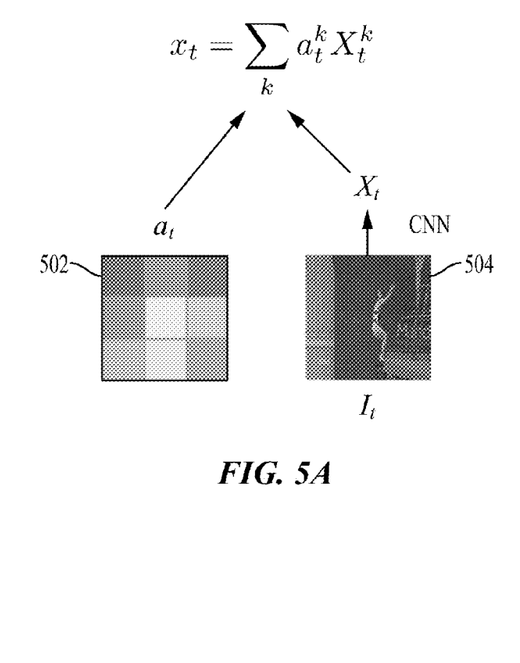
FIG. 5A is a diagram illustrating an image in a video frame for which a label is to be predicted according to aspects of the present disclosure.

FIG. 5A is a diagram illustrating a frame (e.g., image) from a sequence of frames (e.g., a video) for which a classification label is to be predicted. Referring to FIG. 5A, the frame ($I_t$) 504 is provided as an input to a neural network such as a recurrent neural network. An attention map ($a_t$) 502 corresponding to the frame 504 may be predicted, for example by a multi-layer perceptron using the previous hidden state and the current feature map ($X_t$) as input to the neural network (e.g., RNN). The attention map ($a_t$) 502 may be combined with a feature map ($X_t$) generated from the frame 504. The feature map may be generated from an upper convolution layer of a convolutional neural network (e.g., FC2 in FIG. 3B) or via a recurrent neural network, for example. The feature map may be a two-dimensional (2D) or three-dimensional (3D) feature map, for appearance, optical flow, motion boundaries (e.g., gradient of optical flow), semantic segmentation at a feature level, and/or the like.

The attention map 502 provides a recurrent neural network (RNN), or a long short-term memory network (LSTM), with the location of action in a frame 504. The action may be determined by using appearance motion information. As shown in FIG. 5A, an attention map $a_t$ and a feature map $X_t$ may be combined by a weighted sum over all the spatial locations in the frame 504 to compute a weighted feature map $x_t$ (e.g., $x_t = \Sigma_k a_t^k X_t^k$) as an input to the RNN (or LSTM), where $X_t^k$ indicates a feature vector (slice) in the feature map $X_t$ at each location k, and $a_t^k$ is the weight in the attention map at its location in the frame.

Figure 5B:
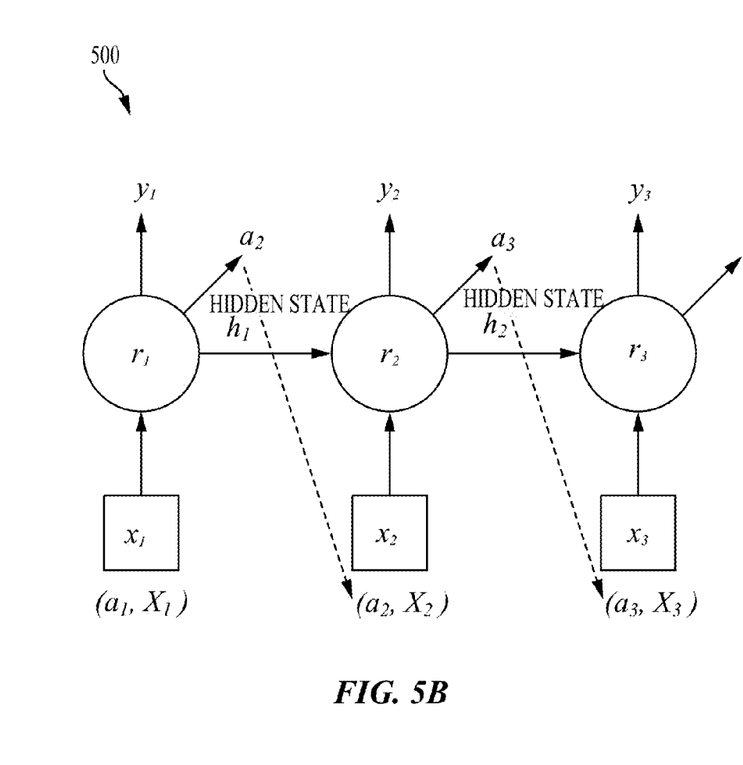
FIG. 5B is a diagram illustrating an exemplary architecture for predicting an action in a video frame in accordance with aspects of the present disclosure.

FIG. 5B illustrates an example of architecture 500 of an attention recurrent neural network for predicting an action in a frame. The exemplary architecture 500 may comprise a recurrent neural network, such as a long short-term memory (e.g., an attention long short-term memory (LSTM) network). The exemplary architecture 500 may include an input layer with input units (e.g., $x_1, x_2, x_3, \ldots$), a hidden layer having hidden units (e.g., $r_1, r_2, r_3, \ldots$) and an output layer with output units (e.g., $y_1, y_2, y_3, \ldots$) and attention maps (e.g., $a_1, a_2, a_3, \ldots$). Each of the units may, for example, comprise artificial neurons or neural units. As shown in FIG. 5B, for a first frame (e.g., in a sequence of frames), an attention map $a_1$ and a feature map $X_1$ are supplied and used to compute a first input $x_1$ to a first hidden unit $r_1$ of the attention recurrent neural network. In some aspects, the feature map of the first frame ($X_1$) may comprise appearance information (e.g., visual information from the content of the frame).

The first hidden unit $r_1$ predicts a first classification label $y_1$ and outputs a first hidden state $h_1$ that is used to generate a second attention map $a_2$ (e.g., subsequent attention map) for a second frame. The classification label may be referred to as a label, a class of interest, or an action label. Furthermore, the classification label indicates an action, an object, an event in the frame and/or the sequence of frames. The first hidden unit $r_1$ also outputs the first hidden state $h_1$ to a second hidden unit $r_2$. The hidden state at a time step is an internal representation of the neural network (e.g., attention RNN) at that time step.

The feature map $X_2$ and the second attention map $a_2$ may be used to determine a second input $x_2$ of the attention RNN, which is input to the second hidden unit $r_2$ (that generates a second hidden state $h_2$). The hidden state of the second hidden unit $r_2$ is then used to predict a third attention map $a_3$ and a second classification label $y_2$ (e.g., the action) for the second frame.

The feature map $X_3$ and attention map $a_3$ may be used to determine input $x_3$ of the attention RNN, which is supplied to the third hidden unit $r_3$. The hidden state of the third hidden unit $r_3$ is used to predict the next attention map and an action label $y_3$ (e.g., the action of frame 3) for a third frame. This process may then be repeated for each subsequent frame at each succeeding time step.

Figure 6:
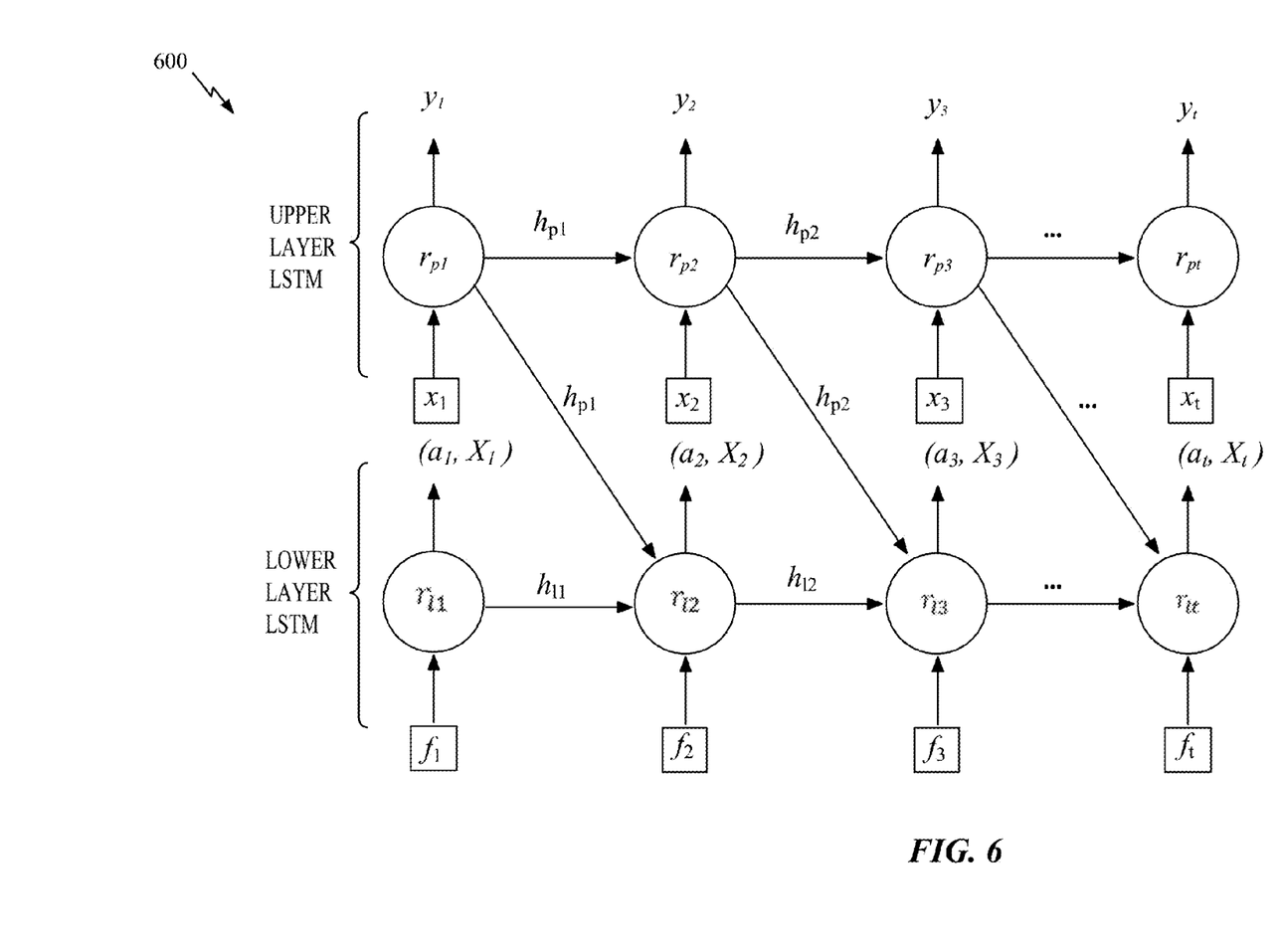
FIG. 6 is a diagram illustrating an exemplary architecture for predicting action in a video frame in accordance with aspects of the present disclosure.

FIG. 6 is a diagram illustrating an exemplary architecture 600 for predicting action in a frame and/or a sequence of frames, in accordance with aspects of the present disclosure. The exemplary architecture 600 may be configured as a stratified network including upper layer recurrent neural networks and lower layer recurrent neural networks (e.g., two layers of recurrent neural networks). Although the architecture 600 includes recurrent neural networks (LSTMs), this is exemplary, as other neural network architectures are also considered. For example, the upper layer may be a recurrent neural network and the lower layer may be an upper convolution layer of a convolutional neural network. In another example, the upper layer or lower layer may comprise a recurrent neural network and the upper layer or lower layer may comprise multiple stacked recurrent neural network or long short-term memory layers.

The lower layer recurrent neural network uses the motion information $f_t$ and the hidden states from the previous frame to generate an attention saliency map for the current frame t. The motion information $f_t$ may be produced from optical flow, which may be estimated using the current frame and the next frame. The motion information $f_t$ may be produced via an upper convolution layer of a CNN. For example, the lower layer recurrent neural network unit $r_{l2}$ may use the hidden state of the previous hidden unit $r_{l1}$, the hidden state $h_{p1}$ of the upper layer recurrent neural network unit $r_{p1}$ along with motion information $f_2$ to generate the attention map $a_2$ for a second frame. As such, the lower layer recurrent neural network may provide the upper layer recurrent neural network with attention maps. The layer units may be artificial neurons or neural units.

The generated attention map $a_t$ for a current frame may be combined with a representation of the current frame of a sequence of frames (e.g., video stream). The frame representation may be a frame feature map $X_t$ to create the input $x_t$ for the upper layer recurrent neural networks. In turn, the upper layer recurrent neural network may be configured to output a classification label $y_t$ for the current frame t. In addition, the upper layer recurrent neural network $r_{pt}$ may output a hidden state $h_t$ of the upper layer recurrent neural network (RNN) unit, which may be supplied to subsequent hidden units $r_{lt}$ of the lower layer recurrent neural network and used to calculate or infer the attention map for the subsequent frame $a_{t+1}$.

In operation, as shown in FIG. 6, for a first frame (time step $t_1$), an attention map $a_1$ may be predicted using a first lower hidden unit $r_{l1}$, which receives the motion information $f_t$ as input to the lower layer of the stratified network. The motion information may be produced from an optical flow, which may be computed using the first frame and the second frame. In one configuration, the optical flow is computed using two adjacent frames (e.g., frames of a video). The attention map $a_1$ is applied to the frame feature map $X_1$ to calculate an input $x_1$ comprising combined features. The combined features of the first input $x_1$ are output to the first upper hidden layer $r_{p1}$, which may predict a first classification label $y_1$. For example, the first classification label may label the frame as containing a diver, as shown in the frame 504 of FIG. 5A.

In addition, the first upper layer unit $r_{p1}$ outputs its hidden state $h_{p1}$ as an input to the subsequent lower hidden unit $r_{l2}$ at a next frame. In this example, the second lower hidden unit $r_{l2}$ receives a lower unit hidden state $h_{l1}$ from the first lower hidden unit $r_{l1}$. The hidden state of the first upper hidden unit $r_{p1}$ is also provided to the second upper hidden unit $r_{p2}$ of the upper layer. The hidden unit $r_{l2}$ also receives a motion input $f_2$ produced from optical flow. The optical flow input may be a field of vectors that predict how pixels of a frame (e.g., frame t) will move to pixels at a next frame (e.g., frame t+1). For example, if the optical flow vector is a 2D vector expressed as 2,3 at x,y, the optical flow indicates that the pixels of frame t will move 2 pixels right and 3 pixels up in the subsequent frame t+1. That is, the optical flow tracks action in the pixels and considers motion to predict the most salient features within the frame or sequence of frames of a video.

Using the optical flow and the hidden states (e.g., $h_{p1}$ and $h_{l1}$) from prior hidden units $r_{p1}$ and $r_{l1}$, a new attention map $a_2$ may be inferred via the hidden layer unit $r_{l2}$. The second attention map $a_2$ may be used with the frame appearance feature map of the second frame $X_2$ to calculate a second input $x_2$ to the second upper hidden unit $r_{p2}$. The second attention map $a_2$, which may include motion information (e.g., optical flow), may improve the identification of the regions of interest in the frame (e.g., actors) in comparison to previous frames. Thus, the second attention map may improve the label prediction.

The second upper hidden unit $r_{p2}$ may then predict a new hidden state $h_{p2}$ that infers a second classification label $y_2$. The hidden state of the second upper hidden unit $r_{p2}$ may be output to the third lower hidden unit $r_{l3}$ and may be used along with the hidden state of the second lower hidden unit $r_{l2}$ as well as the motion input (e.g., optical flow) $f_3$ to compute a third attention map $a_3$ for a third frame. The third attention map $a_3$ may be used along with the feature representation of the third frame (e.g., third frame feature map $X_3$) to compute a third input $x_3$ for the third upper hidden unit $r_{p3}$, which in turn predicts a new hidden state that infers a classification label for the third frame. Thereafter, the process may be repeated.

Aspects of the present disclosure are not limited to the number of exemplary hidden units of a neural network shown in FIGS. 5B and 6. Of course, more or fewer hidden units of a neural network are also contemplated.

In one configuration, a machine learning model is configured for receiving a video stream. The model is also configured for calculating an optical flow of either the current frame and a previous frame or the current frame and a next frame of the video stream. Additionally, the model is configured for generating an attention map from the current frame of the video stream and the calculated optical flow. Further, the model is configured for predicting an action label for the current frame based on the optical flow, a previous hidden state and the attention map. The model includes receiving means, means for calculating an optical flow, means for generating an attention map and/or means for predicting an action label. In one aspect, the receiving means, calculating means, generating means and/or predicting means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

Figure 7:
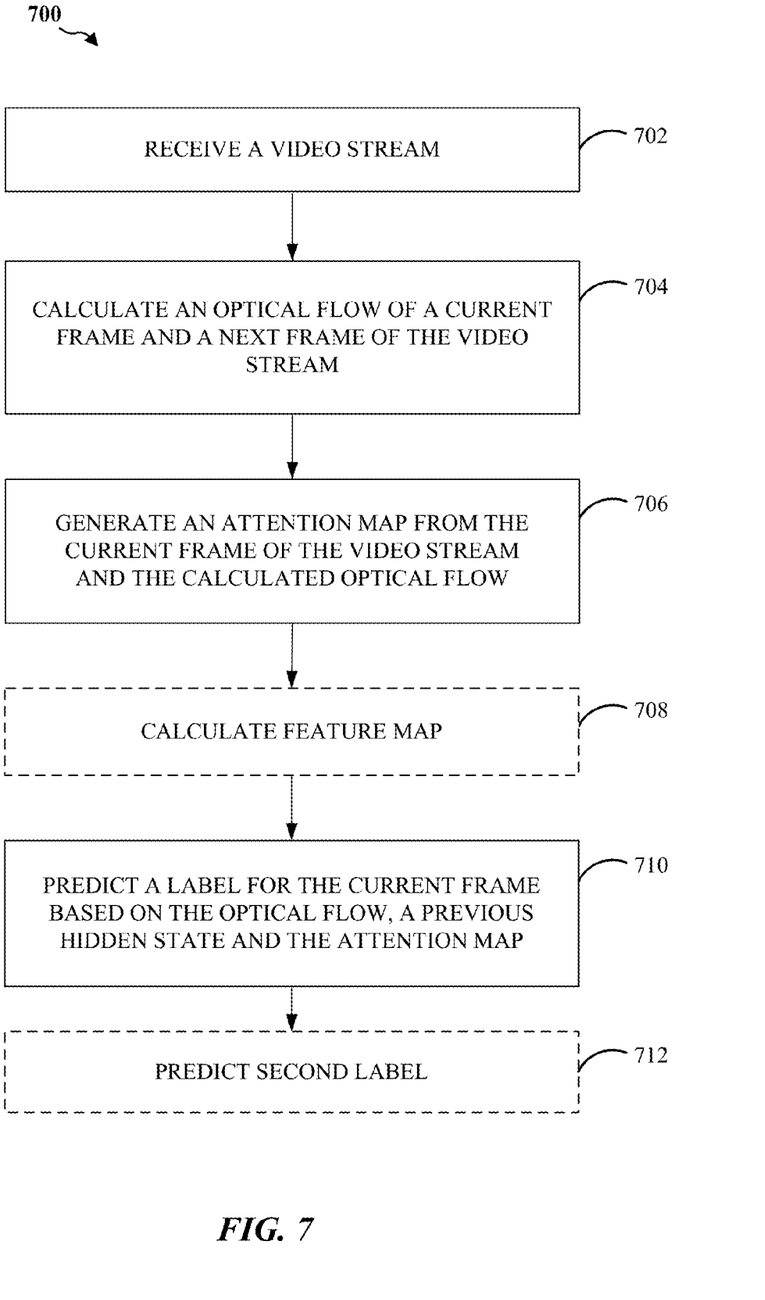
FIG. 7 illustrates a method for predicting labels in a video stream according to aspects of the present disclosure.

FIG. 7 illustrates a method 700 of predicting action labels for a video stream. In block 702, the process receives a video stream. For example, a neural network receives a frame (e.g., image) from a sequence of frames (e.g., a video) for which a classification label is to be predicted. Referring to FIG. 5A, the frame ($I_t$) 504 is provided as an input to a neural network such as a recurrent neural network. In block 704, the process calculates an optical flow. The optical flow may be calculated for a current frame and a next frame of the video stream. In some aspects, optical flow may be calculated from consecutive frames of the video stream.

In block 706, the process generates an attention map from the current frame of the video stream and the calculated optical flow. For example, as seen in FIG. 5A, an attention map ($a_t$) 502 corresponding to the frame 504 may be predicted, for example by a multi-layer perceptron using the previous hidden state and the current feature map ($X_t$) as input to the neural network (e.g., RNN).

Optionally, in block 708, the process may calculate a 2D or 3D feature map from the current frame of the video stream and the optical flow. For example, the feature map may be generated from an upper convolution layer of a convolutional neural network (e.g., FC2 in FIG. 3B) or via a recurrent neural network. The 2D or 3D feature map may be determined based on frame appearance, optical flow (e.g., motion boundaries), a spectrogram image (audio), semantic segmentation (e.g., object labels) or a combination thereof.

Furthermore, in block 710, the process predicts an action label for the current frame based on the video frame, a previous hidden state and the attention map. An action label may, for example, describe an action, motion or activity (e.g., diving, running) carried out by an object of interest in a frame of the video stream. In some aspects, a recurrent neural network (RNN) predicts the action label. In some configurations, the RNN may include a long short-term memory network.

The process may further predict a second action label in optional block 712. The second action label is predicted for the next frame based on the optical flow, a previous hidden state, the 2D or 3D feature map, and the attention map.

In some aspects, the method 700 may be performed by the SOC 100 (FIG. 1) or the system 200 (FIG. 2). That is, each of the elements of the method 700 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of predicting action labels for a video stream, comprising:
   receiving the video stream;
   calculating an optical flow of a current frame and a next frame of the video stream;
   generating an attention map from the current frame of the video stream, a first previous hidden state from a first layer of an artificial neural network, a second previous hidden state from a second layer of the artificial neural network, and the calculated optical flow; and
   predicting an action label for the current frame based on the optical flow, the second previous hidden state, and the attention map.

2. The method of claim 1, further comprising:
   calculating a two-dimensional (2D) or three-dimensional (3D) feature map from the current frame of the video stream and the attention map; and
   predicting a second action label for the next frame based on the optical flow, the 2D or 3D feature map, and the attention map.

3. The method of claim 2, in which the 2D or 3D feature map is based on one or more of a frame appearance, the optical flow, a spectrogram image, or semantic segmentation.

4. The method of claim 1, further comprising predicting the action label with a recurrent neural network (RNN).

5. The method of claim 4, in which the RNN comprises a long short-term memory (LSTM) network.

6. An apparatus for predicting action labels for a video stream, comprising:
   a memory; and
   at least one processor coupled to the memory, the at least one processor configured:
   to receive the video stream;
   to calculate an optical flow of a current frame and a next frame of the video stream;
   to generate an attention map from the current frame of the video stream, a first previous hidden state from a first layer of an artificial neural network, a second previous hidden state from a second layer of the artificial neural network, and the calculated optical flow; and
   to predict an action label for the current frame based on the optical flow, the second previous hidden state, and the attention map.

7. The apparatus of claim 6, in which the at least one processor is further configured:
   to calculate a two-dimensional (2D) or three-dimensional (3D) feature map from the current frame of the video stream and the attention map; and
   to predict a second action label for the next frame based on the optical flow, the 2D or 3D feature map, and the attention map.

8. The apparatus of claim 7, in which the 2D or 3D feature map is based on one or more of a frame appearance, the optical flow, a spectrogram image, or semantic segmentation.

9. The apparatus of claim 6, in which the at least one processor is further configured to predict the action label with a recurrent neural network (RNN).

10. The apparatus of claim 9, in which the RNN comprises a long short-term memory (LSTM) network.

11. An apparatus for predicting action labels for a video stream, comprising:
    means for receiving the video stream;
    means for calculating an optical flow of a current frame and a next frame of the video stream;
    means for generating an attention map from the current frame of the video stream, a first previous hidden state from a first layer of an artificial neural network, a second previous hidden state from a second layer of the artificial neural network, and the calculated optical flow; and
    means for predicting an action label for the current frame based on the optical flow, the second previous hidden state, and the attention map.

12. The apparatus of claim 11, further comprising:
    means for calculating a two-dimensional (2D) or three-dimensional (3D) feature map from the current frame of the video stream and the attention map; and
    means for predicting a second action label for the next frame based on the optical flow, the 2D or 3D feature map, and the attention map.

13. The apparatus of claim 12, in which the 2D or 3D feature map is based on one or more of a frame appearance, the optical flow, a spectrogram image, or semantic segmentation.

14. The apparatus of claim 11, further comprising means for predicting the action label with a recurrent neural network (RNN).

15. The apparatus of claim 14, in which the RNN comprises a long short-term memory (LSTM) network.

16. A non-transitory computer-readable medium having program code recorded thereon for predicting action labels for a video stream, the program code being executed by a processor and comprising:
- program code to receive the video stream;
- program code to calculate an optical flow of a current frame and a next frame of the video stream;
- program code to generate an attention map from the current frame of the video stream, a first previous hidden state from a first layer of an artificial neural network, a second previous hidden state from a second layer of the artificial neural network, and the calculated optical flow; and
- program code to predict an action label for the current frame based on the optical flow, the second previous hidden state, and the attention map.

17. The non-transitory computer-readable medium of claim 16, further comprising:
- program code to calculate a two-dimensional (2D) or three-dimensional (3D) feature map from the current frame of the video stream and the attention map; and
- program code to predict a second action label for the next frame based on the optical flow, the 2D or 3D feature map, and the attention map.

18. The non-transitory computer-readable medium of claim 17, in which the 2D or 3D feature map is based on one or more of a frame appearance, the optical flow, a spectrogram image, or semantic segmentation.

19. The non-transitory computer-readable medium of claim 16, further comprising program code to predict the action label with a recurrent neural network (RNN).

20. The non-transitory computer-readable medium of claim 19, in which the RNN comprises a long short-term memory (LSTM) network.

\* \* \* \* \*